# United States Patent [19]

Burns et al.

[11] Patent Number: 4,578,201

[45] Date of Patent: Mar. 25, 1986

[54] N-VINYL LACTAM/UNSATURATED AMIDE COPOLYMERS IN THICKENED ACID COMPOSITIONS

[75] Inventors: Lyle D. Burns; G. Allan Stahl, both of Bartlesville, Okla.

[73] Assignee: Phillips Petroleum Company, Bartlesville, Okla.

[21] Appl. No.: 586,504

[22] Filed: Mar. 5, 1984

[51] Int. Cl.[4] ............................................. E21B 43/27
[52] U.S. Cl. ................................ 252/8.55 C; 166/307
[58] Field of Search ................... 252/8.55 C; 526/260, 526/287

[56] References Cited

U.S. PATENT DOCUMENTS

| | | | |
|---|---|---|---|
| 3,252,904 | 5/1966 | Carpenter | 252/8.55 C |
| 3,421,584 | 1/1969 | Eilers et al. | 166/33 |
| 3,434,971 | 3/1969 | Atkins et al. | 252/8.55 C |
| 3,482,636 | 12/1969 | Crowe | 166/307 |
| 3,768,565 | 10/1973 | Persinski et al. | 166/308 |
| 3,791,446 | 2/1974 | Tate | 166/307 |
| 3,923,666 | 12/1975 | Dill | 252/8.55 C |
| 3,924,684 | 12/1975 | Tate | 166/307 |
| 4,002,589 | 1/1977 | Farley | 525/59 |
| 4,044,833 | 8/1977 | Volz | 166/307 |
| 4,079,011 | 3/1978 | Tate | 252/8.55 C |
| 4,107,057 | 8/1978 | Dill | 252/8.55 C |
| 4,191,657 | 3/1980 | Swanson | 252/8.55 C |
| 4,210,205 | 7/1980 | Allen et al. | 166/271 |
| 4,219,429 | 8/1980 | Allen et al. | 252/8.55 C |
| 4,244,826 | 1/1981 | Swanson | 252/8.55 C |
| 4,277,580 | 7/1981 | Allen et al. | 525/383 |
| 4,309,523 | 1/1982 | Engelhardt | 526/287 |
| 4,323,123 | 4/1982 | Swanson | 166/302 |
| 4,404,111 | 9/1983 | Bi et al. | 526/287 |

*Primary Examiner*—Theodore Morris
*Attorney, Agent, or Firm*—Arch Robbins

[57] ABSTRACT

Water soluble thickened acid compositions suitable for matrix or fracture acidizing are provided comprising water, an acid, and a water thickening amount of a copolymer of a N-vinyl lactam and an unsaturated amide. This composition can contain in addition a crosslinking agent to give a gelled acid composition. In a preferred embodiment, a lactam-containing copolymer is made in a diluent containing dissolved electrolytes. These compositions are particularly useful in acid or matrix fracturing in subterranean formations exhibiting a hostile environment, as exemplified by high temperatures and/or high concentration of multivalent metal cations.

40 Claims, No Drawings

N-VINYL LACTAM/UNSATURATED AMIDE COPOLYMERS IN THICKENED ACID COMPOSITIONS

BACKGROUND OF THE INVENTION

This invention relates to stimulation procedures to increase oil recovery.

The use of aqueous acidic compositions for treating subterranean formations to stimulate the production of hydrocarbons therefrom by acidizing and/or fracturing is known. It is also known to thicken such aqueous acid compositions by incorporating a water soluble or water dispersible polymeric viscosifier. Various gelling or crosslinking agents and/or foaming agents have been added to polymer-containing aqueous acid compositions to form retarded acid gels suitable for introduction into subterranean formations. However, the polymeric thickening agents are degraded by hostile reservoir environments such as high temperature, acidity and shear conditions as well as electrolytes encountered in acidizing processes. These stimulation techniques which last only a few days at most (after which the well returns to normal, but enhanced, production) distinguishes from enhanced oil recovery techniques which involve injection of polymers which remain in use for months.

BRIEF SUMMARY OF THE INVENTION

It is an object of this invention to provide improved thickened acid compositions.

It is a further object of this invention to provide improved methods of forming thickened acids.

It is yet a further object of this invention to provide improved acidizing techniques.

It is still yet a further object of this invention to provide compositions for acidizing and/or acidizing and fracturing in situations involving hostile environments.

In accordance with one aspect of this invention, a water soluble polymer of an N-vinyl lactam and an alpha,beta-unsaturated amide is used to thicken acid solutions. In accordance with another aspect of this invention, a copolymer of an N-vinyl lactam and an alpha, beta-unsaturated amide prepared in an aqueous system containing dissolved electrolytes is used to thicken an aqueous acid composition.

DESCRIPTION OF THE PREFERRED EMBODIMENTS

For the purpose of this description, the term "thickened acids" refers broadly to aqueous solutions of acids containing water soluble or water dispersible polymeric viscosifiers with or without a crosslinking agent. The term "gelled acids" refers to aqueous acid compositions comprising water soluble or water dispersible polymeric viscosifiers and a crosslinking or gelling agent. The viscosity imparted to the aqueous acid depends on molecular weight, concentration of polymeric viscosifier in the acid, and the degree of crosslinking. Also it is a function of the inherent thickening power of the polymer used. The polymer compositions set out for use herein have good inherent thickening power. Thus, it is possible to have a very high molecular weight polymeric viscosifier in high concentration to give a thickened acid in the absence of a crosslinking agent which is more viscous than a gelled acid having low molecular weight, lightly crosslinked polymeric viscosifier in low concentration. Indeed, by virtue of their unexpected thermal and acid stability, the ungelled compositions of this invention have a greater range of useful viscosity than crosslinked polymeric viscosifiers of the prior art.

The term "copolymer" as used herein encompasses copolymer viscosifier compositions derived from a vinyl-containing lactam comonomer and an unsaturated amide optionally containing in addition a vinyl-containing sulfonate or the corresponding acid, as well as compositions arising from such in combination with at least one additional monomer. The term "linear" polymer or copolymer refers to a polymer made in the absence of a crosslinking agent during polymerization and is intended to broadly encompass the polymer used to make "gelled" acid compositions as well as "thickened" acid compositions containing no crosslinking agent. This term excludes polymers made in the presence of crosslinking agent during polymerization. "Termonomer" refers to an additional monomer as hereinafter defined which may in fact be the third monomer or may be a fourth monomer.

The thickened acid compositions of this invention are most suitable for fracture acidizing subterranean oil formations to enhance oil recovery. However, they may also be used in matrix acidizing or to thicken mud acids which are a combination of hydrochloric and in situ generated hydrofluoric acid from HCl and ammonium bifluoride.

The thickened acid compositions of this invention can also be used as the acid of a pad/acid technique. This technique werein low cost conventional hydraulic fracturing is followed by etching with acid (in effect as an alternative to propping agents) is disclosed in Hendrickson et al, *The Journal of Canadian Petroleum Technology,* pages 1–5 (January–March 1969) the disclosure of which is hereby incorporated by reference. Propping agents may still be used in conjunction with the teachings of this invention to further enhance oil production. The linear thickened acid compositions of this invention can finger through high viscosity pads and provide a more conductive etch pattern than crosslinked acid compositions. When the heat breaks down the pad fluid it can dilute the thickened acid since it can be uncrosslinked. Also, while the thickened acid compositions of this invention can be used at any temperature, their stability to high temperatures give them yet another advantage in formations having high temperatures and/or high divalent ion concentrations.

The thickened acid compositions are prepared by dissolving or dispersing an N-vinyl lactam, unsaturated amide copolymeric viscosifier as defined herein in an aqueous acid solution. Thickened acid compositions are useful as prepared. Although higher viscosity for a given polymer concentration can be obtained by crosslinking such thickened acid compositions to form gelled acid, the excellent stability of the compositions of this invention results in a preference for the ungelled embodiment. The ungelled embodiment is preferred because the gelled embodiment is more difficult to effect in the field and because of the outstanding stability of the uncrosslinked compositions in the invention.

The thickened acid compositions of this invention thus resist degeneration by acid and/or shear as well as heat and/or electrolyte content of the formation and/or makeup water. The acid compositions of this invention also have good friction reducing properties. They possess sufficient mobility to permit good penetration of the live acid composition into the formation with reduced fluid loss to the matrix of the fracture. Once penetration has been attained, the compositions are capable of remaining in contact with the formation for a period of time sufficient for the acid in the composition to react with the acid-soluble component of the formation creating new conductive passageways or enlarging existing passageways through the formation and stimulate the production of fluids therefrom. Thereafter the compositions should be such that no permanent gel forms but rather the material is or becomes sufficiently fluid to be largely recovered to open the thus produced and/or enlarged fractures to oil recovery. However, the spent acid compositions do retain sufficient viscosity to suspend unreacted rock fines or formation debris for removal from the formation during fluid recovery.

The basic components of the acid compositions are:
(1) water;
(2) acid;
(3) polymeric viscosifier; and
(4) crosslinking agent (optional)

The water can be essentially pure water, i.e., tap water, or can be sea water or simulated sea water as discussed in detail hereinafter, or a saline solution such as field brine or connate water. Generally, the most readily available water is the field brine.

Acids useful in the practice of the invention include any acid which is effective in increasing the flow of fluids, e.g., hydrocarbons, through the formation and into the well. Thus, under proper conditions of use, examples of such acids can include mineral or inorganic acids, such as hydrochloric acid, phosphoric acid, nitric acid, sulfuric acid, sulfamic acid, and hydrofluoric acid. HF can be generated in situ. In addition $C_1$–$C_4$ organic acids such as formic acid, acetic acid, propionic acid, butyric acid, halogenated carboxylic acids, such as chloroacetic and chloropropionic acid, and mixtures thereof, in combination with inorganic acids such as HCl are also suitable. The non-oxidizing inorganic acids are preferred. Hydrochloric acid is most preferred.

The concentration or strength of the acid can vary depending upon the type of acid, the type of formation being treated, the above-stated compatibility requirements and the results desired in the particular treating operation. Generally speaking, the concentration of the acid can vary from about 0.4 to about 60 weight percent (or the maximum solubility of the acid), based on the total weight of the thickened acid composition, depending upon the type of acid, with concentrations within the range of 5 to 50 weight percent usually preferred. Most preferably aqueous acids of a concentration of 15 to 28 weight percent acid based on the water and acid are used. This range is particularly representative for aqueous hydrochloric acid which usually contains up to 32 weight percent HCl.

The compositions of this invention can be used in conjunction with surfactants and known foaming techniques with an inert gas such as nitrogen or carbon dioxide to produce a 65 or greater quality foam. The foam volume is determined by dividing the gas volume in the foam by the total foam volume and multiplying by 100 as disclosed in Norman et al U.S. Pat. No. 4,324,669 (Apr. 13, 1982) the disclosure of which is hereby incorporated by reference. The acids used in the practice of the invention can also contain corrosion inhibitors, emulsifying agents, sequestering agents, friction reducers, fluid loss additives and other conventional additives known in the art. The compositions of this invention may be combined with oil wetting surfactants commonly used in chemically retarded acids to provide acid retardation.

The polymeric viscosifiers are produced from a N-vinyl lactam monomer or mixture thereof and an alpha,-beta-unsaturated amide or mixture thereof optionally including one or more additional monomers. The lactam and amide each constitute 10 to 90, preferably 20 to 80, more preferably 30 to 70 weight percent of the monomers charged. Copolymers are thus encompassed having 10–90 weight percent N-vinyl lactam, 10–90 weight percent unsaturated amide and 0–80 weight percent of a hydrophilic vinyl-containing sulfonate and/or the corresponding acid, preferably 30 to 70 weight percent each of the lactam and amide and 0–40 weight percent of the sulfonate. If the sulfonate is present at all it is preferably present in an amount within the range of 1–80 preferably 10–40 weight percent, i.e. a finite amount up to 40 or up to 80 weight percent. All of these monomers are termed hydrophilic in that if homopolymerized the polymer would be water soluble.

In one embodiment, a superior copolymer is produced utilizing an aqueous polymerization medium with dissolved electrolytes. The copolymers will be described in greater detail hereinafter.

The amount of the N-vinyl lactam/unsaturated amide-derived polymers used in preparing the thickened acid compositions of the invention can vary widely depending upon the particular polymer used, the purity of the polymer and properties desired in the final composition, but will be a water-thickening amount, i.e., at least an amount which will significantly thicken the aqueous acid solution to which it is added. For all practical purposes, the amount of polymer employed in the instant compositions will generally be within the range of from about 0.01 to about 5 weight percent, based upon the total weight of the composition, with from about 0.10 to about 2 weight percent being preferred in most cases.

The crosslinking agent when used can be added to the polymer solution before or after the acid is added, and before or during the process of employing the acid composition, as, for example, injecting the composition into a well bore in a formation. This crosslinking of polymers to gel a thickened acid composition is distinguished from crosslinking carried out during the polymerization process which tends to produce polymers which are water insoluble. The crosslinking agents for forming gel are known in the art. The most preferred crosslinking agent is a mixture of formaldehyde and acetaldehyde because of their relatively low cost, good availability and the excellent results obtained. However, any water-dispersible aldehyde can be used as other conventional crosslinking agents such as titanium and zirconium reagents. Examples of titanium and zirconium compounds are titanium acetylacetonate, zirconium oxychloride, zirconium lactate and other zirconates and organotitanates. Thus under proper conditions of use, both aliphatic and aromatic monoaldehydes, and also dialdehydes, can be used. The aliphatic monoaldehydes containing from about 1 to about 10 carbon atoms per molecule are presently preferred. Representative examples of such aldehydes include in addition to the formaldehyde and acetaldehyde previously discussed, paraformaldehyde, propionaldehyde, butyraldehyde, isobutyraldehyde, valeraldehyde, heptaldehyde, and decanal, for instance, representative examples of dialdehydes include glyoxal, glutaraldehyde, succinaldehyde, and terephthaldehyde. Reducing sugars may also be used—sucrose, fructose, etc. Various mixtures of the aldehydes can also be used and may be preferred, as previously noted. The processing agents employed are water dispersible which is meant to include both those which are truly water soluble and those of limited water solubility but which are dispersible in water or other aqueous media to be effective gelling agents.

Aldehyde precursors such as aldehyde acetals can also be used which form aldehydes in situ in the aqueous media generally as the result of a hydrolysis reaction. Redox crosslinking systems can also be used involving, for instance, sodium dichromate and sodium bisulfite or sodium hydrosulfite ($Na_2S_2O_4$) as disclosed in Clampitt et al, U.S. Pat. No. 3,845,822 (Nov. 5, 1974) the disclosure of which is hereby incorporated by reference.

Any suitable amount of crosslinking agent can be used in the gelling procedure. In all instances, the amount of crosslinking agent will be a small but effective amount which is sufficient to cause gelation of an aqueous dispersion of the polymer, and the acid. As a general guide, the amount of crosslinking agent used in preparing the gelled acid compositions of the invention will be in the range of from about 0.001 to about 5, preferably from about 0.004 to about 2 weight percent, based on the total weight of the composition. Too much crosslinking agent can be detrimental to gel stability, e.g., can cause or promote syneresis and/or cause the gel to become brittle. Those skilled in the art can determine the amount of crosslinking agent to be used by suitable experiments carried out in the light of this disclosure.

The invention is utilized in acidizing porous subterranean formations penetrated by a well bore so as to increase the production of fluids, e.g., crude oil, natural gas, and like hydrocarbons from the formation. Acidizing involves introducing an acid into a well under sufficient pressure to force the acid out into the formation where it reacts with the acid soluble components of the formation. The present invention is directed to a variation of this technique wherein the acid is thickened, or gelled, so as to retard the effect of the acid until the injected material has penetrated a greater distance into the formation. The technique is not limited to formations of high acid solubility, such as limestone or dolomite, but is also applicable to other kinds of formations, such as sandstone containing streaks of acid soluble components such as the various carbonates.

The hostile environment or conditions as referred to herein is meant any one of four conditions or any combination thereof. First is shear. The polymer compositions of this invention are stable under high shear rates as encountered in pumping. For instance they are easily stable at shear rates of ten to sixty barrels per minute down various sizes of tubing for periods of time long enough to reach the well bottom in wells up to ten thousand to forty thousand feet deep. Secondly, they are stable for very long periods of time under conditions of high temperature and/or high divalent ion concentration, i.e. hostile environment within the formation. The compositions are stable at temperatures of 170° F. (77° C.) under multivalent ion concentrations of 500 ppm by weight or more and they are even stable at temperatures above 250° F. (121° C.) and multivalent ion concentrations of 1000 ppm by weight or more. While the compositions are useful at lower temperatures also they are of particular utility in formations having temperatures of 170° to 400° F. (77°–204° C.).

Finally, and of most importance, they are stable to high concentrations of acid. This stability which is of importance even at room temperature greatly enhances the desirability of the compositions of this invention because it allows making acid compositions under conditions of high hydrogen ion concentration (low pH) several days prior to the time they are to be used. Of course, any pH below 7 defines an acidic condition but the invention is primarily concerned with acid systems where the pH is about 3 or below, generally about 1 to 2.

The following is a more complete description of the lactam polymers utilized in this invention and their methods of preparation. The N-vinyl lactam component of the copolymer is of the formula

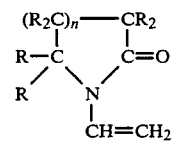

where R is selected from the group consisting of hydrogen, methyl and ethyl and n is an integer of from 1 to 3 most preferably 1. These monomers are generally water-soluble or water-dispersible. The monomer unit presently most preferred is N-vinyl-2-pyrrolidone.

The alpha,beta-unsaturated amide component has the following formula

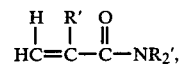

where R' is methyl, ethyl or hydrogen.

The third and optional comonomer is referred to as a vinyl-containing sulfonate which is meant to encompass the acid also. It is represented by the following formula:

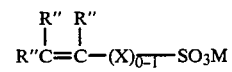

where R" is methyl, ethyl or H preferably methyl or H and provided further that at least one of the R" groups on the terminal carbon of the vinyl group is H and the other is H or methyl, M is H, $Na^+$, $K^+$, $Li^+$, $R'''_4N^+$, $Ca^{++}$ or $Mg^{++}$ and X is

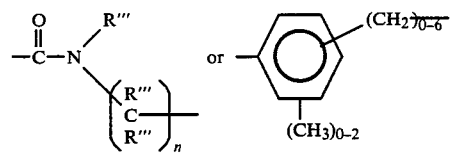

where n is an integer of 1–5 preferably 1–3 and R''' is a 1-3 carbon atom alkyl group or H.

Examples of suitable compounds are:

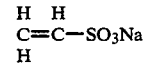

vinylsulfonate, sodium salt

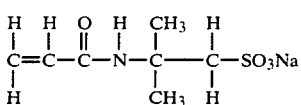

sodium 2-acrylamido-2-methylpropane sulfonate (sodium AMPS)

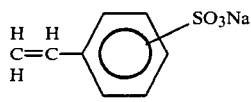

styrene sulfonate, sodium salt

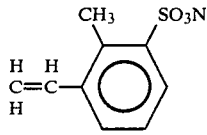

sodium vinyltoluene sulfonate

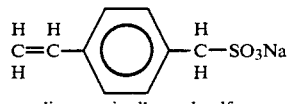

sodium p-vinylbenzyl sulfonate

These are known monomers and can be produced as is known in the art. Particularly with regard to the N-sulfohydrocarbon-substituted acrylamides, they are disclosed in U.S. Pat. No. 3,679,000 assigned to the Lubrizol Corporation, the disclosure of which patent is incorporated by reference. The 2-acrylamido-2-methylpropane sulfonic acid is available from Lubrizol under the designation AMPS.

The monomers presently preferred are N-vinyl-2-pyrrolidone (VP), acrylamide (Am), and sodium 2-acrylamido-2-methylpropane sulfonate (NaAMPS). For convenience, the terms VP, Am, and NaAMPS will be used to refer to the first, second, and third comonomers respectively, in the discussions herein.

The total number of R, R', or R''' groups in the above formulae which can be other than hydrogen must be small enough that the monomers are still hydrophilic as defined hereinbefore.

Suitable termonomers include vinylpyridines such as 4-vinylpyridine and vinylpyridine-N-oxide, acryloyl morpholine, vinyl methyl ether, vinylmethyloxazolidone, vinyl sulfuric acid and methacrylic acid, these also being hydrophilic or defined hereinabove.

As the copolymerization reaction produces polymer in essentially quantitative yield, the desired ratios of VP to Am to NaAMPS, if present, can be obtained by controlling the ratios of monomers charged to the reactor to give random as opposed to block polymer.

The polymers used in this invention can be formed using solution, emulsion, inverse emulsion (water-in-oil) or slurry (precipitation) polymerization processes. In one embodiment, a process for producing the copolymers comprises carrying out the polymerization in a solution process in which the polymerization medium is water containing certain dissolved electrolytes, or presently most preferably, water containing dissolved salts such as found in sea water, to provide a simulated or synthetic sea water (SSW). Natural sea water and formation brines can also be used as the polymerization media and can be filtered to remove solid material if desired or necessary. Brines containing a high percentage of dissolved solids can be diluted with fresh water to provide an appropriate concentration of dissolved solids. Alternatively, salts can be added, if deemed necessary to obtain the desired salt level. In another embodiment, slurry polymerization is preferably conducted with a polymerization medium consisting essentially of an alcohol, preferably a neat tertiary alkanol which generally has from 4 to about 8 carbon atoms, most preferably t-butyl alcohol, since the polymeric product is insoluble in the alcohol and can thus be conveniently separated.

In accordance with another embodiment of the copolymer preparation, the copolymers are prepared by carrying out the polymerization in a polymerization medium using monomer concentrations ranging broadly from the minimum required to produce a polymer solution of the desired viscosity, e.g., as low as 0.1 weight percent, up to very concentrated solutions which amount to admixtures of the monomers with a minor amount of the polymerization medium, e.g., as high as 80 weight percent monomers based on the monomers plus medium. The polymers prepared in the preferred media in monomer concentrations over this broad range will all exhibit stable viscosities, when exposed to hostile environments of high temperature and/or salinity and/or hardness and/or high hydrogen ion concentration, and/or high shear stress, but will not be as viscous as those prepared at optimum monomer concentrations. However, the polymers are generally produced from solutions of total monomer concentrations ranging from about 5 to about 50 weight percent. Preferably, polymerization is carried out in a solution of total monomer concentration in the range from about 1 to about 40 weight percent, since the use of monomer concentrations below about 3 weight percent tends to be uneconomical, and optimum polymer viscosity is generally obtained at less than about 35 weight percent monomers. Also, when a high concentration of electrolytes is to be used in an aqueous medium, the higher concentrations of monomers may inhibit the solubility of the electrolytes. For free radical initiation in aqueous media containing electrolytes, monomer concentrations in the range of from about 15 to about 35 weight percent are most effective, with concentrations of about 20 to 30 weight percent particularly preferred. For alcoholic media, monomer concentrations in the range of from about 1 to about 35 weight percent are most effective, with concentrations of about 10 to 20 weight percent particularly preferred.

For a given copolymer and set of polymerization conditions, the viscosity obtained will reach a maximum for a certain range of monomer concentrations in the polymerization medium, generally lying between about 10 to about 40 weight percent. Reaction rate increases, thus reaction time decreases, as the weight percent of monomers is increased. Thus, it is generally desirable to use a concentration of monomers which will produce a polymer of maximum viscosity in a reasonable reaction time. Other considerations are the actual viscosity required of the polymer in its applications, solubility of the polymer in its applications, solubility of the polymers in water, and transportation/handling expenses.

The SSW used for preparation of many of the polymers described herein (unless otherwise indicated), for example, was prepared with the ingredients tabulated below to contain the following quantities of dissolved salts.

| Compound | Quantity |
| --- | --- |
| $NaHCO_3$ | 3.69 g |
| $Na_2SO_4$ | 77.19 g |
| NaCl | 429.00 g |
| $CaCl_2.2H_2O$ | 29.58 g |
| $MgCl_2.6H_2O$ | 193.92 g |
| $H_2O$, distilled to | 18.0 liters mark |

This "recipe" was calculated to produce the ionic concentrations tabulated below:

| Ion | Concentration, ppm |
| --- | --- |
| $Na^+$ | 10,550 |
| $Ca^{+2}$ | 437 |
| $Mg^{+2}$ | 1,256 |
| $HCO_3^-$ | 145 |
| $Cl^-$ | 18,540 |
| $SO_4^{-2}$ | 2,828 |
| Total | 33,756 |

This was equivalent to a total concentration of dissolved salts of about 3.4 weight percent, or an ionic strength of about 0.7. The divalent hardness cations ($Ca^{+2}$ and $Mg^{+2}$) amounted to about 16 weight percent of the total cations. Various combinations of such salts can be used to prepare solutions with ionic concentrations approximating those of sea water from various locations.

Electrolyte-containing SSW polymerization media employed in the invention can have salinity values ranging from about 10 to 100 g per kg, and preferably from about 30 to about 43 g/kg, of the solution. Salinity is defined as the total dissolved solids in water. In natural sea water, salinity and chlorinity are related by the expression: salinity = 1.835 x chlorinity, according to "The Oceans, Their Physics, Chemistry and General Biology", by H. V. Sverdrup, M. W. Johnson and R. H. Fleming, Prentice-Hall, Inc. 1942, p. 51. Thus, calculated chlorinities corresponding to salinities of 30 to 43 g/kg of solution range from about 16 to about 23 g/kg of solution. The ionic strengths of the solutions corresponding to these ranges vary from about 0.6 to about 0.9. It can readily be seen that a salinity of 100 g/kg is approximately equivalent to 10 percent dissolved solids, based upon the weight of the solution.

The Sverdrup reference, on p. 55, states that salinity in the oceans generally lies between about 33 to 37 g/kg sea water but may reach 40 g/kg sea water or more in certain locations such as the Red Sea. However, the reference states, on p. 165, that regardless of the absolute concentration of dissolved solids, the ratios between the more abundant substances remain virtually constant. Preferably, synthetic sea water compositions should have approximately this ratio, although the overall concentration can vary.

A composition for simulated sea-salt for preparation of "substitute ocean water" (SOW) is disclosed in ASTM D-1141 (1982, part 31, p. 1074). The composition contains the following compounds which when dissolved in water at the quantities shown to make a liter of solution will provide a substitute ocean water for testing purposes. The materials and the quantities required to make a liter of solution are shown in the table.

TABLE 1

| Substitute Ocean Water - ASTM D 1141 | | |
| --- | --- | --- |
| Compound | g/L | Weight Percent |
| NaCl | 24.53 | 68.08 |
| $MgCl_2$ | 5.20 | 14.43 |
| $Na_2SO_4$ | 4.09 | 11.35 |
| $CaCl_2$ | 1.16 | 3.22 |
| KCl | 0.695 | 1.93 |
| $NaHCO_3$ | 0.201 | 0.56 |
| KBr | 0.101 | 0.28 |
| $H_3BO_3$ | 0.027 | 0.07 |
| $SrCl_2$ | 0.025 | 0.07 |
| NaF | 0.003 | 0.008 |
| Totals | 36.032 | 99.998 |
| $Ba(NO_3)_2$ | 0.0000994 | |
| $Mn(NO_3)_2$ | 0.0000340 | |
| $Cu(NO_3)_2$ | 0.0000308 | |
| $Zn(NO_3)_2$ | 0.0000096 | |
| $Pb(NO_3)_2$ | 0.0000066 | |
| $AgNO_3$ | 0.00000049 | |

The compounds above the line generally comprise those used in making substitute ocean water. Such a product is commercially available as "sea salt" from Lake Products Co., Inc., Ballwin, Mo. The trace amounts of the compounds listed below the line can be optionally included to more closely approximate ocean water when desired.

The chloride content of the 10 component system (Table 1) used in preparing the substitute ocean water is about 19.26 g/kg solution, counting the bromide and fluoride ions as chloride ions. This corresponds to a calculated salinity of about 35.3 g/kg solution. The total dissolved solids are 36.03 g/L of solution, which amount to about 3.5 weight percent of the solution.

At a constant weight ratio of components as indicated in Table 1, the weights of each component can be calculated at various salinities for the 10 component system. The calculated weights, total dissolved solids and estimated weight percent thereof based on 1 liter of solution and the calculated ionic strengths thereof are given in Table 2.

TABLE 2

| Calculated Component Ranges for Substitute Ocean Water | | | | |
| --- | --- | --- | --- | --- |
| | Salinities | | | |
| Component | 30 | 33 | 40 | 43 |
| NaCl, g | 20.85 | 22.93 | 27.80 | 29.88 |
| $MgCl_2$, g | 4.42 | 4.86 | 5.89 | 6.33 |
| $Na_2SO_4$, g | 3.47 | 3.82 | 4.63 | 4.98 |
| $CaCl_2$, g | 0.986 | 1.08 | 1.31 | 1.41 |
| KCl, g | 0.591 | 0.650 | 0.788 | 0.847 |
| $NaHCO_3$, g | 0.171 | 0.188 | 0.228 | 0.245 |
| KBr, g | 0.086 | 0.094 | 0.114 | 0.123 |
| $H_3BO_3$, g | 0.023 | 0.025 | 0.031 | 0.033 |
| $SrCl_2$, g | 0.021 | 0.023 | 0.028 | 0.030 |
| NaF, g | 0.0025 | 0.0028 | 0.0034 | 0.0037 |
| Total Dissolved Solids, g | 30.62 | 33.67 | 40.88 | 44.28 |
| Wt. % Solids | 3.0 | 3.3 | 4.0 | 4.3 |
| Calculated Ionic Strength | 0.60 | 0.67 | 0.81 | 0.87 |

The data presented in Table 2 show that the calculated ionic strengths for salinities varying from 30 g to 43 g per liter of solution range from about 0.6 to about 0.9.

At a constant weight ratio of the 5 component SSW system generally used in preparing the copolymers for use in the invention, the weights of each component are calculated for salinities ranging from 30 g to 43 g per liter of solution. The calculated weights, total dissolved solids and estimated weight percent thereof based on 1 liter of solution and the calculated ionic strengths thereof are given in Table 3.

TABLE 3

Calculated Component Ranges For Synthetic Sea Water (SSW)

| Component | Salinities | | | |
|---|---|---|---|---|
| | 30 | 35.3(SSW) | 38 | 43 |
| NaCl, g | 19.950 | 23.830 | 25.650 | 29.030 |
| MgCl$_2$, g | 4.288 | 5.046 | 5.432 | 6.147 |
| Na$_2$SO$_4$, g | 3.644 | 4.288 | 4.616 | 5.223 |
| CaCl$_2$, g | 1.396 | 1.643 | 1.769 | 2.001 |
| NaHCO$_3$, g | 0.174 | 0.205 | 0.221 | 0.250 |
| Total Dissolved Solids, g | 29.452 | 35.012 | 37.688 | 42.651 |
| Wt. % Solids | 2.9 | 3.4 | 3.7 | 4.1 |
| Calculated Ionic Strength | 0.59 | 0.70 | 0.76 | 0.86 |

The presently preferred polymerization medium used to produce the copolymers used in this invention is the 5 component system shown in Table 3 above having a calculated ionic strength of about 0.7 and about 3.4 weight percent dissolved solids. It is expected that polymerization media shown in the various tables, regardless of the number of components present in the media, which have calculated ionic strengths ranging from about 0.6 to about 0.9, will also be highly suitable in preparing the various outstanding polymers of this invention. Also, more concentrated or more dilute versions of these SSW compositions, having ionic strengths in the range from about 0.2 to 3.0, can be prepared and used as polymerization media for this invention.

On the other hand, the aqueous polymerization media of this invention can be oil field brines, at natural, concentrated or dilute strength. Such brines can be filtered or otherwise purified to remove undesirable solid matter.

Oil field brines can contain up to about 25% by weight, based on water, of dissolved inorganic salts. In addition to NaCl, brines usually contain up to about 10% by weight, based on the total amount of salts present, of Ca$^{+2}$ and Mg$^{+2}$. Small amounts of other soluble Periodic Group I and Group II salts are also frequently present, e.g., NaHCO$_3$, KCl, BaCl$_2$ and the like. Typical brines contain from about 1 to 14 wt.%, based on water, of dissolved salts.

Although the reasons for the superiority of aqueous polymerization media containing mixed electrolytes are not presently understood, copolymers prepared in such media have been found to have higher viscosities than similar polymers prepared in conventional media such as distilled water. Also, these polymers are more resistant to high temperature, salinity, acidity and hardness ions, retaining their viscosity longer under such conditions than the polymers prepared using media such as distilled water, even under the imposition of high shear.

A presently preferred mixed electrolyte mixture for the aqueous polymerization media of this invention contains at least one electrolyte selected from a first group consisting of alkali metal salts and, at least one electrolyte selected from a second group consisting of alkaline earth metal salts, as an approximation to a synthetic sea water. Although not presently understood, it appears that the combination of monovalent and divalent cations is at least one property of synthetic sea water which enhances the properties of copolymers prepared in such media. Thus, it is believed that a fraction of divalent hardness cations to total cations of at least about 1 weight percent will improve a polymerization medium containing NaCl or other alkali metal electrolytes. Since the synthetic sea water used successfully contained about 16 weight percent hardness cations (based upon total cations), the polymerization media should preferably contain such a fraction of at least about 10 weight percent hardness cations, but can contain up to about 50 weight percent or even more, as with simple mixtures of the alkali metal and alkaline earth salts. The presence of certain anions may also enhance the effect of the polymerization media described herein, perhaps through a buffering action. Various concentrations of the salts can be used, generally ranging from about 0.1 to about 10 weight percent or more, preferably at least 1 weight percent, based upon the total weight of the polymerization medium.

In addition to the use of a specified concentration of a mixture of electrolytes containing both alkali and alkaline earth metal salts, the aqueous polymerization media containing such electrolytes can be characterized by the resulting Ionic Strength, given by the formula:

$$I.S. = \tfrac{1}{2}\Sigma C_1 Z_1^2 + C_2 Z_2^2 + \ldots C_n Z_n^2$$

where $C_1$, $C_2$, etc. each represent the molar concentration of a different ion in the polymerization media, $Z_1$, $Z_2$, etc. are the charges of the respective ions, both positive and negative, and n equals the number of different ions in the polymerization medium.

For further discussion of ionic strength, see, e.g., Fritz and Schenk, "Quantative Analytical Chemistry", Second Edition (Allyn & Bacon, Boston, 1969), pages 9–10.

Generally, aqueous polymerization media with electrolyte ionic strengths in the range of from about 0.4 to about 3.0 are effective in improving the properties of the copolymers used in this invention; preferably, amounts of mixed electrolytes sufficient to produce an ionic strength of in the range from about 0.5 to about 2.0 are used, as ionic strengths in this range have been found to produce significant improvements in the polymers prepared in such polymerization media. Aqueous polymerization media having ionic strengths in the range of about 0.6 to about 0.8 are presently preferred for most applications, as polymers having viscosities higher than otherwise obtainable and excellent heat stability can be prepared therein. These ionic strengths "bracket" the ionic strength of natural sea water, which for, e.g., the North Sea, is about 0.7.

The pH of the aqueous polymerization media employed in preparing the copolymers used in this invention should be controlled during the polymerization process, as excessive acidity or alkalinity can adversely affect the polymerization process or result in excessive hydrolysis of the product copolymer. Generally a pH in the range of from 4 to about 10.5 is acceptable.

With predominantly lactam and unsaturated amide polymerizations, the preferred pH is 5 to 10.5, more preferably 8.5 to 10.5. With systems containing a significant amount of sulfonate monomer a pH of 7 to 10.5 is generally preferred.

An added benefit of the use of electrolytes in the polymerization media of this invention is that the combinations of electrolytes used generally will buffer the pH to a value within the preferred range, as with natural sea water. The molecular weights of polymers produced are higher at a given pH using water containing dissolved electrolytes than systems using deionized water.

The polymers useful in this invention can be prepared by processes using various free radical polymerization initiators known to those skilled in the art. Preferred initiators include chemical polymerization initiators, the introduction of electromagnetic or nuclear radiation to generate free radicals, and combinations of both techniques.

Chemical polymerization initiators employable in the polymerization processes are oil or water soluble compounds known in the art to generate free radicals for this purpose selected from azo compounds, organic peroxides and hyponitriles. Examples of azo compounds and organic peroxides are 2,2'-azobisisobutyronitrile (commercially available as Vazo-64® from E. I. Du Pont), Vazo-67® is 2,2'-azobis(2-methylbutyronitrile), Vazo-52® is 2,2'-azobis(2,4-dimethylvaleronitrile), Vazo-33® is 2,2'-azobis(2,4-dimethyl-4-methoxyvaleronitrile), 2-t-butylazo-2-cyanopropane, 2-t-butylazo-2-cyanobutane, and 2-t-butylazo-1-cyanocyclohexane, benzoyl peroxide, di-t-butyl peroxide, t-butyl peroxyacetate, t-butyl peroxypivalate, 2-t-butylazo-2-cyano-4-methoxy-4-methylpentane (commercially available as Luazo®55 from Lucidol Div., Pennwalt Corp.) and 2-t-butylazo-2-cyano-4-methylpentane (Lauzo®70, available from the same source), 4,4'-azobis(4-cyanovaleric acid), 4-t-butylazo-4-cyanovaleric acid 2,2'-azobis(2-amidinopropane) dihydrochloride (V-50, available from Wako Pure Chemical Industry), 2,2'-azobis(N,N'-dimethylene isobutyamidine) dihydrochloride (V-56, also available from Wako Pure Chemical Industry), and the like. Hyponitrite initiators include t-butyl hyponitrite and t-amyl hyponitrite. The azo compounds are presently preferred as some peroxides appear to have a tendency to adversely affect the copolymer; however, some peroxides are effective at lower temperatures than those at which most azo compounds are useful. Presently preferred compounds include p-menthane hydroperoxide activated by $FeSO_4.7H_2O$, and especially Vazo-33, since polymers prepared in its presence generally yield more viscous solutions, e.g., higher molecular weight polymer, than those prepared in the presence of t-butyl peroxypivalate. The commercially available V-50 and V-56 initiators are preferred because they are water soluble. An inert atmosphere substantially free of oxygen or other known inhibiting materials should be provided when chemical polymerization initiators are used.

Chemical polymerization initiators which are substantially soluble in the polymerization media can be added directly to the monomer solution, or dissolved or dispersed in a small amount of monomer or solvent which is miscible or soluble therein before being added to said polymerization media.

Chemical polymerization initiators which are insufficiently soluble in the polymerization media in the concentration required for initiation can be added in the commercially available state or dispersed as a fine powder, but are generally more effectively employed if dissolved in a liquid soluble or miscible in the medium. For example, a water-miscible solvent such as acetone or an alcohol can be used to solubilize otherwise water insoluble compounds such as Vazo-33® and Vazo-64®, and to disperse them in the aqueous polymerization media. Alternatively the initiator can be dissolved in a monomer such as the N-vinyl lactam.

The copolymers useful in this invention can also be prepared in processes where initiation can be achieved at least partially by irradiation such as by electromagnetic or nuclear radiation, e.g., gamma radiation, as known to those skilled in the art. The resulting polymers when diluted with water or SSW to a common solids level, for example, 2 weight percent or less, are generally found to exhibit solution viscosities comparable to or greater than similar polymers prepared by chemical initiation. Such irradiation can be used to initiate polymerization either alone or in conjunction with the chemical initiators already mentioned as well as other commonly used free radical initiators and sensitizers. In contrast to the inert atmosphere required when chemical initiators are used, oxygen can be present when radiation alone is used to initiate polymerization, although superior results are obtained when oxygen is excluded. While gamma radiation from sources such as cobalt 60, cesium 137 and iridium 192 is presently preferred, other sources of radiation can be used, including X-rays, beams of neutrons, electrons or other charged particles, or ultraviolet light from sunlight or artificial sources. An amount and intensity of such radiation should be used to effectively provide the desired viscosity and an essentially complete polymerization.

The intensity of the radiation, thus the dosage rate, can be varied during the process. Dose and dose rate are interdependent variables, and should be selected in tandem, and in conjunction with other relevant variables as known to those skilled in the art.

Radiation methods can be used to initiate polymerization in various aqueous and organic media. The copolymers can be prepared by radiation polymerization in aqueous media containing mixed electrolytes, as previously disclosed, or in media consisting essentially of at least one alcohol, preferably a neat tertiary alkanol, as previously disclosed.

It has been discovered that copolymers of exceptional viscosity and resistance to the adverse effects of hostile environments, e.g., high temperature, salinity, shear rates, high acid concentration and hardness ion content, can be prepared by polymerizing a monomer mixture comprising N-vinyl-2-pyrrolidone and acrylamide by free radical initiation at least partially carried out by the introduction of electromagnetic or nuclear radiation preferably gamma radiation. Preferably an aqueous polymerization medium is used, with media comprising a synthetic sea water or dissolved electrolytes, as previously disclosed, particularly preferred.

Radiation polymerization can be carried out over a broad range of polymerization temperatures (taken as the average temperature of the monomer solution), ranging from just above freezing to just below the boiling point of the monomer solution. However, chilling the monomer solution to counteract the heating effect of the polymerization reaction can produce advantage such as higher molecular weight. Thus, in one embodiment, it is preferred to chill the polymerization mixture to a temperature above freezing before, during, and/or after irradiation.

Normally, about 0.05 to about 2.0 weight percent of chemical initiator based on total monomer weight is used for chemical initiation alone, with a reaction temperature in the range of about $-10°$ C. to about 80° C., preferably about $-10°$ C. to 60° C., more preferably 5° to 25° C. The decomposition characteristics of the initiator will dictate preferred temperature range, e.g. Vazo-64®=50° C.; Vazo-33®=21° C.; t-amylhyponitrite=15° C. The reaction is generally substantially complete, i.e., providing substantially quantitative monomer conversion, after about 1 to about 10 hours.

Smaller quantities of initiator require longer polymerization time, but produce higher molecular weights. A reaction time of about 2 hours is normally employed in 50° C. bench scale processes. The resulting polymers are not necessarily isolated. Instead, the solutions are further diluted as formed to obtain the desired concentration of polymer. However, the polymers generally can be isolated, dried and redissolved or dispersed at or near the location where they are to be used, thus minimizing transportation costs. Generally, the polymers formed in an alcoholic medium are more readily isolated, if desired, than those formed in aqueous media.

In one embodiment a low temperature active chemical initiator such as 2,2'-azobis(2,4-dimethyl-4-methoxyvaleronitrile), Vazo-33 ®, is used at a polymerization temperature of 10° C. to 25° C. to give particularly high molecular weight copolymer. The unstirred reaction masses provide gel log products with 20–30 weight percent solids directly suitable for on site preparation and field use.

In addition to varying the monomer proportions, the molecular weight of all the inventive polymers can be varied according to the amount of initiator used or by initiation with gamma irradiation.

EXAMPLES

Example I

This example demonstrates the superior effectiveness of uncrosslinked poly(N-vinyl-2-pyrrolidone-co-acrylamide) (VP/Am) to provide retarded thickened aqueous acid compositions.

Three test solutions, designated herein, respectively, as solutions, A, B, and C, were prepared by dissolving sufficient quantities of poly(N-vinyl-2-pyrrolidone-co-acrylamide) (VP/Am; 50/50 wt/wt), sodium 2-acrylamido-2-methylpropanesulfonate-co-acrylamide (AMPS/Am; 70/30 wt/wt), and poly(N-vinyl-2-pyrrolidone) (PVP) in 28 weight percent hydrochloric acid to yield said solutions containing 1.2 weight percent of said polymers. Solution D was prepared by dissolving poly(N-vinyl-2-pyrrolidone-co-acrylamide) (VP/Am; 50/50 wt/wt) in 28 percent hydrochloric acid to yield said solution containing 0.6 weight percent of said polymer. The polymers used in solutions A (VP/Am) and C (PVP) were prepared by chemical initiation with 2,2'-azobisisobutyronitrile (AIBN); the polymer in solution B (AMPS/Am) is a commercial sample.

The viscosities of solutions A, B and C were measured on a Fann 35 viscometer at ambient temperature and the results were summarized in Table I.

TABLE I

| | Viscosities of Thickened Acids (28 wt % HCl) | | | |
|---|---|---|---|---|
| Shear | Solution Viscosity (cP) | | | |
| Rate (rpm) | Solution A[a] | Solution B[b] | Solution C[c] | Solution D[d] |
| 100 | 60 | 45 | 6 | 66 |
| 200 | 48 | 35 | 4.5 | 54 |
| 300 | 41 | 30 | 4 | 50 |
| 600 | 33 | 25 | 4.5 | 41 |

[a]1.2 weight percent solution of 50/50 VP/Am in 28 wt. % HCl
[b]1.2 weight percent solution of 70/30 AMPS/Am in 28 wt. % HCl
[c]1.2 weight percent solution of PVP in 28 wt. % HCl
[d]0.6 weight percent solution of 50/50 VP/Am in 28 wt. % HCl Referring to the results in Table I, it is evident that at comparable polymer concentrations in 28 wt % aqueous HCl, that the viscosity values for the inventive 50/50 VP/Am copolymer solution (solution A) were significantly greater than the viscosities of comparable solutions containing 70/30 AMPS/Am copolymer (solution B) and poly(N-vinyl-2-pyrrolidone) (PVP) (solution C). Solution D with the 50/50 VP/Am copolymer, made by gamma ray initiation, which copolymer is believed to have higher molecular weight, has a higher viscosity at half the concentration when compared to solutions A, B, and C.

Solutions A and B were further compared by capillary viscometer measurements. The densities (D) of solutions A and B were found to be 1.1 g/mL and the calibration factors (CF) for solutions A and B, respectively, for a Cannon-Fenske capillary viscometer were 8.86 and 8.58 centistokes/sec. After determining efflux times (ET) in said viscometer for solutions A and B, relative viscosities and centipoise were calculated as the product of the three factors ET, D and CF. In determining the efflux times, 15 mL of the solution was poured into a capillary viscometer mounted in a 2-liter water bath at about 70 F. The efflux time for fluid flow in the viscometer was measured at intervals as the water bath temperature was increased to 200 F. at a rate of three degrees per minute. Results are given in Table II to reflect the relative viscosities of solutions A and B over a range of temperatures.

TABLE II

| | Relative Viscosities of Thickened Acids | | | |
|---|---|---|---|---|
| | Solution A[a] | | Solution B[b] | |
| Temp. F. | ET (Sec) | Visc.(cP) | ET(Sec) | Visc.(cP) |
| 75 | 8.78 | 86 | 5.33 | 50 |
| 100 | 7.14 | 70 | 4.70 | 44 |
| 125 | 5.61 | 55 | 3.88 | 37 |
| 150 | 4.62 | 45 | NM* | NM* |
| 175 | 3.46 | 34 | 2.72 | 26 |
| 200 | 2.69 | 26 | 1.72 | 16 |

[a,b]As defined in Table I in 28 wt % aqueous HCl
*NM represents not measured

Referring to the results in Tables I and II, it is evident that the inventive system (solutions A and D) retained solution viscosity more effectively as the temperature increased than did the system of the commercial AMPS/Am copolymer in solution B. The implication of this observation is that the 50/50 VP/Am system would possess 1. Less fluid loss to the formation during acid fracturing.

2. Deeper penetration of live acid since the acid is retarded by the viscosity.

3. Since the polymer is stable in hostile environments, the viscosity is effectively reduced by dilution with broken pad fluids, connate waters and the like to generate a reduced viscosity of 3–12 cP so as to recover the fluid from the formation, but also to retain enough viscosity so as to suspend and return unreacted formation fines or debris and to exhibit a desirable lower fluid loss to the formation on producing back spent acid fluids compared to the AMPS/Am fluid in solution B or other polymeric viscosifying agents which are not stable in hostile environments are reduced to a water like viscosity rapidly, many times before the injection operation is complete.

Uncrosslinked VP/Am copolymers in thickened aqueous acid compositions were spent on marble chips in a pressure vessel at 300 F. over a time interval of 3 hours at 100 psi. On breaking, these thickened acids left no insoluble residues indicating that field use of these compositions in acid fracturing operations would result in essentially no formation damage from insoluble residues.

Example II

This example demonstrates the utility of radiation initiated VP/Am copolymers and chemically initiated VP/Am copolymers in crosslinked gelled acid compositions.

A high molecular weight 50/50 VP/Am copolymer was prepared by gamma irradiation of a distilled water polymerization medium containing equal weights of N-vinyl-2-pyrrolidone (VP) and acrylamide (Am). A sample of this copolymer was mixed with 64 mL of concentrated hydrochloric acid, 8 mL of water, 0.3 mL of 37 weight percent aqueous formaldehyde and 0.9 mL of 33 weight percent aqueous acetaldehyde. A stable crosslinked gel resulted which exhibited good shear thinning resistance, as evidenced by its capacity to rapidly regain its viscosity after successive passages through a stainless steel hand homogenizer. A similarly prepared crosslinked gelled acid composition comprising a 70/30 sodium 2-acrylamido-2-methylpropanesulfonate-co-acrylamide (NaAMPS/Am) copolymer exhibited much less shear stability on passage through said homogenizer. Said 70/30 NaAMPS/Am copolymer was prepared by gamma irradiation of a distilled water polymerization medium containing NaAMPS and Am comonomers in a 70:30 weight ratio.

A 50/50 VP/Am copolymer was prepared by chemical initiation in a deionized water polymerization medium containing equal weights of N-vinyl-2-pyrrolidone (VP) and acrylamide (Am) in the presence of 0.5 weight percent 2,2'-azobisisobutyronitrile (AIBN) based on total weight of charged monomers. A crosslinked gelled acid composition of this VP/Am copolymer was prepared by mixing 27 mL of a 3 weight percent aqueous solution of said copolymer, 64 mL of concentrated hydrochloric acid and 8 mL of water. To this viscous acidic mixture was added 2.7 mL of 37 weight percent aqueous formaldehyde and 1 mL of 33 weight percent aqueous acetaldehyde to cause the formation of a stable crosslinked gel within 20 minutes. At ambient conditions this crosslinked gel was stable over a 45 day period.

Example III

This example demonstrates the ability of the inventive radiation initiated VP/Am copolymers to form gelled acid compositions over the range of 7.5 to 28 weight percent aqueous hydrochloric acid. By contrast, the 70:30 NaAMPS/Am copolymer is gelled only in HCl concentrations of 23 weight percent HCl or higher. Thus there is a further advantage to these lactam-containing polymers in HCl at concentrations of 7.5 to 22 weight percent because of the ability to thicken and an advantage at all concentrations of acid because of the stability. The gelled acid compositions from the inventive VP/Am copolymers were also noted to be less brittle than those similarly prepared from NaAMPS/Am copolymers. Representative results are summarized in Table III.

TABLE III

High Molecular Weight Gamma Ray Initiated 50/50 VP/Am Copolymer Crosslinked at Various HCl Concentrations

| Copolymer Concentration (wt %)* | Concentration Wt % of Each Aldehyde[a] | HCl Concentration Wt % | Remarks[b] |
|---|---|---|---|
| 0.4 | 0.3 | 28 | gelled at 187F |
| 0.4 | 0.3 | 15 | gelled at 176F |
| 0.4 | 0.3 | 10 | gelled at 194F |
| 0.4 | 0.3 | 7.5 | gelled at 193F |

[a]Formaldehyde and acetaldehyde were used
[b]All gelled acids were shear stable on passage through a stainless steel hand homogenizer
*In several related experiments, it was noted that the inventive VP/Am copolymer system crosslinks at lower temperatures on increasing the copolymer concentration.

Referring to the runs in Table III, it is evident that the subject copolymers gelled over the range of 7.5 to 28 weight percent HCl. The sample fluids were considered gelled when little or no fluid movement was detectable in a Cannon-Fenske capillary viscometer. In the test procedure, 15 mL of the test sample was poured into a capillary viscometer mounted in a 2-liter water bath at about 70 F. The efflux time for fluid flow in the viscometer was measured at intervals as the water bath temperature was increased to 200 F. at a rate of three degrees per minute.

Example IV

This example demonstrates the lower gelling temperature of the VP/Am copolymer as well as the relatively lower copolymer concentration required for the gelling operation. Representative results are shown in Table IV.

TABLE IV

Copolymer Gelling Capacity

| Run No. | Copolymer | Copolymer Conc. Wt % | Aldehyde Vol. Each, mL/100 mL | Gelling Temp. F. |
|---|---|---|---|---|
| 1 (Invention) | VP/Am(50/50)[a] | 0.6 | 0.3 | 113 |
| 2 (Invention) | VP/Am(50/50)[b] | 0.4 | 0.3 | 180 |
| 3 (Invention) | VP/Am(50/50)[b] | 0.4 | 0.5 | 171 |
| 4 (Invention) | VP/Am(50/50)[b] | 0.6 | 0.5 | 160 |
| 5 (Invention) | VP/Am(50/50)[c] | 0.4 | 0.3–0.5 | Does not gel |
| 6 (Invention) | VP/Am(50/50)[c] | 0.6 | 0.5 | 174 |
| 7 (Control) | NaAMPS/Am(70/30)[d] | 0.4 | 0.3–0.5 | Does not gel |
| 8 | NaAMPS/Am(70/30)[d] | 0.6 | 0.5 | 146 |

TABLE IV-continued

| | | Copolymer Gelling Capacity | | |
|---|---|---|---|---|
| Run No. | Copolymer | Copolymer Conc. Wt % | Aldehyde Vol. Each, mL/100 mL | Gelling Temp. F. |
| (Control) | | | | |

*a*This copolymer was prepared in water by gamma ray initiation of a 50/50 wt/wt mixture of N—vinyl-2-pyrrolidone (VP) and acrylamide (Am).
*b*This copolymer was prepared in synthetic seawater by reacting equal weights of N—vinyl-2-pyrrolidone and acrylamide in the presence of 0.25 wt % of AIBN.
*c*This copolymer was prepared in deionized water by reacting equal weights of N—vinyl-2-pyrrolidone and acrylamide in the presence of 0.5 wt % AIBN
*d*This copolymer was prepared in water by gamma ray initiation of a 70/30 wt/wt mixture of sodium 2-acrylamido-2-methylpropanesulfonate (NaAMPS) and acrylamide (Am).

Referring to the runs in Table IV, it is evident (note run 1) that the radiation initiated 50/50 VP/Am copolymer system had the lowest gelling temperature (113 F.). From runs 2,3,4,5, and 6 of Table IV, it is evident that the 50/50 VP/Am copolymer is preferably made in synthetic seawater if chemically initiated. Referring to runs 1 and 6, it is apparent that the radiation initiated VP/Am copolymer (run 1) is preferred (lower gelling temperature) over the chemically initiated VP/Am copolymer (deionized water polymerization medium). Runs 2,3,7 and 8 indicate that higher copolymer concentrations are required for gelling in the NaAMPS/Am system than in the VP/Am system.

Example V

Another polymer suitable for thickened acid compositions was prepared as follows.

A charge of 99.0 g N-vinyl-2-pyrrolidone (VP), 99.0 g acrylamide (Am), and 462 mL tertiary-butyl alcohol was placed in a one quart crown top reaction bottle along with 0.20 g 2,2'-azobis(2,4-dimethyl-4-methoxyvaleronitrile) (Vazo ®33) (0.10 wt% Vazo ®33 based on total weight of charged monomers). The reaction mixture was degassed for 15 minutes with $N_2$ gas, sealed and allowed to polymerize at ambient temperature for about 72 hours. The reaction mass was removed from the bottle, filtered by Buchner funnel and dried under vacuum without heat. One weight percent solutions of the 50/50 wt/wt VP/Am copolymer were prepared in synthetic seawater for Brookfield viscosity measurements. The Brookfield viscosity was approximately 10 cP.

Another run was carried out which differed only in the quantity of Vazo ®33 initiator charged to the reactor. In this run 0.10 g of the initiator was used (0.05 wt % Vazo ®33 based on total weight of charged monomers). The Brookfield viscosity of a 1 wt% solution of the VP/Am copolymer product was approximately 10 cP.

While this invention has been described in detail for the purpose of illustration, it is not to be construed as limited thereby but is intended to cover all changes and modifications within the spirit and scope thereof.

I claim:

1. A water soluble thickened acid composition comprising:
   (1) water;
   (2) an acid; and
   (3) a copolymer comprising a N-vinyl lactam monomer and an alpha, beta-unsaturated amide monomer made in the absence of a crosslinking agent during polymerization of said monomers.

2. A composition according to claim 1 wherein said copolymer is formed from monomers consisting essentially of said N-vinyl lactam and said unsaturated amide.

3. A composition according to claim 1 wherein said copolymer is formed from monomers comprising in addition a vinyl-containing sulfonate or the corresponding acid.

4. A composition according to claim 1 wherein said copolymer comprises 30–70 weight percent of said N-vinyl lactam, 30 to 70 weight percent of said unsaturated amide and a finite amount up to 40 weight percent of a vinyl-containing sulfonate or the corresponding acid.

5. A composition according to claim 4 wherein said N-vinyl lactam is N-vinyl-2-pyrrolidone, said unsaturated amide is acrylamide or N,N-dimethyl acrylamide, said vinyl-containing sulfonate is sodium 2-acrylamido-2-methylpropane sulfonate and said acid is hydrochloric acid.

6. A composition accordng to claim 1 wherein said N-vinyl lactam is present in said copolymer in an amount within the range of 30 to 70 weight percent based on the total weight of monomers.

7. A composition according to claim 1 wherein copolymer is produced by irradiation initiation.

8. A composition according to claim 1 wherein said copolymer is prepared using a chemical initiator at a temperature within the range of 5° to 25° C.

9. A composition according to claim 1 wherein said acid is a combination of (1) in situ generated HF and HCl or (2) an organic acid and HCl.

10. A composition according to claim 9 wherein said composition contains in addition a crosslinking agent in sufficient quantity to give a gelled acid.

11. A composition according to claim 9 wherein said copolymer is present in an amount within the range of 0.1 to 2 weight percent based on the total weight of said composition and said acid has a concentration within the range of 15 to 28 weight percent based on the total weight of said acid and said water.

12. A composition according to claim 1 which consists essentially of said components (1), (2), and (3).

13. A composition according to claim 1 wherein said acid has a concentration within the range of 15 to 28 weight percent based on the weight of said acid and said water.

14. A composition according to claim 1 wherein said acid is hydrochloric acid.

15. A composition according to claim 1 comprising in addition a crosslinking agent in an amount sufficient to give a gelled acid.

16. A composition according to claim 15 wherein said crosslinking agent is acetaldehyde and formaldehyde.

17. A composition according to claim 15 wherein said crosslinking agent is selected from titanium acetylacetonate, zirconium oxychloride and zirconium lactate.

18. A composition according to claim 1 comprising in addition a foaming agent.

19. A composition according to claim 18 wherein said foaming agent is nitrogen or carbon dioxide and a surfactant.

20. A composition according to claim 19 wherein said copolymer is made at a pH within the range of 8.5 to 10.5.

21. A composition according to claim 1 wherein said copolymer contains in addition a termonomer.

22. A composition according to claim 1 wherein said copolymer is made at a pH within the range of 8.5 to 10.5.

23. A composition according to claim 1 wherein said copolymer is made at a temperature within the range of 5° to 25° C.

24. A composition according to claim 1 wherein said copolymer is produced in an aqueous solution of electrolytes wherein at least one of said electrolytes is selected from a first group consisting of alkali metal salts and wherein at least one of said electrolytes is selected from a second group consisting of alkaline earth metal salts.

25. A composition comprising:
(1) water;
(2) an acid; and
(3) a water thickening amount of a copolymer of monomers comprising an N-vinyl lactam and an alpha, beta-unsaturated amide;
said copolymer being produced in a mixed electrolyte aqueous solvent comprising at least one electrolyte selected from a first group consisting of alkali metal salts and at least one electrolyte selected from a second group consisting of alkaline earth metal salts.

26. A composition according to claim 25 wherein said copolymer comprises 30-70 weight percent of said N-vinyl lactam, 30-70 weight percent of said unsaturated amide and a finite amount up to 40 weight percent of a vinyl-containing sulfonate or sulfonic acid.

27. A composition according to claim 25 wherein said copolymer consists essentially of said N-vinyl lactam and said alpha,beta-unsaturated amide.

28. A composition according to claim 27 wherein said N-vinyl lactam is present in an amount within the range of 30 to 70 weight percent based on the total weight of monomers.

29. A composition according to claim 28 wherein said N-vinyl lactam is N-vinyl-2-pyrrolidone and said alpha,beta-unsaturated amide is acrylamide.

30. A composition according to claim 29 wherein said acid is a non-oxidizing acid.

31. A composition according to claim 30 wherein said acid is hydrochloric acid.

32. A composition according to claim 31 wherein said composition contains in addition a crosslinking agent in sufficient quantity to give a gelled acid.

33. A composition according to claim 31 wherein said copolymer is present in an amount within the range of 0.1 to 2 weight percent based on the total weight of said composition and said acid has a concentration within the range of 15 to 28 weight percent based on the total weight of said acid and said water.

34. A composition according to claim 25 wherein said acid is hydrochloric acid.

35. A composition according to claim 25 comprising in addition a crosslinking agent in an amount sufficient to give a gelled acid.

36. A composition according to claim 35 wherein said crosslinking agent comprises an aldehyde.

37. A composition according to claim 25 comprising in addition a foaming agent.

38. A composition according to claim 37 wherein said foaming agent is nitrogen or carbon dioxide and a surfactant.

39. A composition according to claim 38 wherein said copolymer is present in a concentration within the range of 0.1 to 2 weight percent based on the total weight of said composition, and said acid has a concentration within the range of 15 to 28 weight percent, based on the total weight of said acid and said water.

40. A composition according to claim 25 wherein said copolymer is a water soluble or water dispersible linear copolymer.

* * * * *